Figure 1:
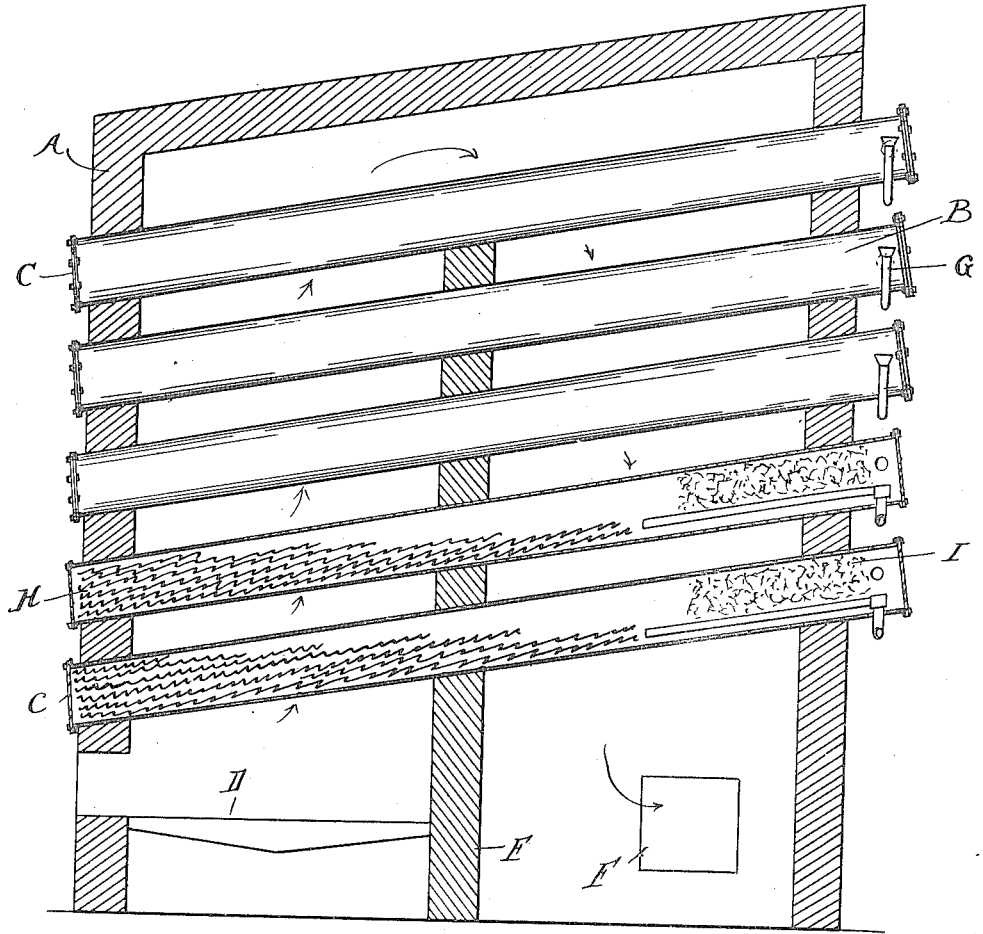

A. H. WHITE.
PROCESS OF FORMING METHYL ALCOHOL AND OTHER COMPOUNDS FROM WASTE LIQUORS CONTAINING ORGANIC MATTER.
APPLICATION FILED NOV. 29, 1915.

1,197,983. Patented Sept. 12, 1916.

Inventor
Alfred H. White,

By Whittemore Hulbert & Whittemore
Attorneys

UNITED STATES PATENT OFFICE.

ALFRED H. WHITE, OF ANN ARBOR, MICHIGAN.

PROCESS OF FORMING METHYL ALCOHOL AND OTHER COMPOUNDS FROM WASTE LIQUORS CONTAINING ORGANIC MATTER.

1,197,983.     Specification of Letters Patent.     Patented Sept. 12, 1916.

Application filed November 29, 1915. Serial No. 64,156.

*To all whom it may concern:*

Be it known that I, ALFRED H. WHITE, a citizen of the United States of America, residing at Ann Arbor, in the county of Washtenaw and State of Michigan, have invented certain new and useful Improvements in Processes of Forming Methyl Alcohol and other Compounds from Waste Liquors Containing Organic Matter, of which the following is a specification, reference being had therein to the accompanying drawings.

The invention relates to improvements in the methods of destructive distillation of liquids containing large amounts of organic matters in solution or suspension and in particular to the recovery of methyl alcohol, acetone and other valuable products by destructive distillation.

It is well known that in processes of destructive distillation there must be regulation not only of temperature and pressure but also of time and contact surface. In the destructive distillation of organic substances containing large amounts of oxygen such as wood there is an exothermic reaction at one stage of the process which in the usual practice causes a material rise in temperature and disturbs the smooth course of the reaction. I have discovered that when such substances are in the form of liquids so that it is possible to introduce them into the retort continuously or in small portions, it is possible not only to control but to take advantage of this exothermic reaction to maintain uniform conditions of destructive distillation, and I have been able to work out advantageous processes for the utilization of what have hitherto been waste products.

The process here described is for the utilization of the waste liquors from mills manufacturing wood pulp by the soda process, but is applicable to other liquids carrying large amounts of organic matters in solution or suspension. In the usual process these liquors are concentrated to a thick syrup and then burned for the recovery of soda, but with the entire loss of the organic matters. It has been hitherto impracticable to subject these to destructive distillation because of their tendency to foam and because of the exothermic reaction occurring at one stage of the process. These difficulties are obviated in my process and an exact control of conditions is allowed.

I have discovered that the quantities of methyl alcohol and acetone obtained from the destructive distillation of this liquor vary markedly with the conditions and have determined what the conditions must be to secure advantageous yields. For commercial reasons the operations are carried out at almost normal atmospheric pressure, but the temperature, time of heating and extent of contact substance are controlled. A variation in any one of these factors affects the others, and in general the higher the temperature within certain limits and the greater the amount of contacting surface the shorter the time required for treatment. Also I have found that the temperature of the vapor space should not be less than 450° F. or more than 750° F. and that the time of treatment of the vapors within the retort should be within the limits of 5 to 150 seconds.

Figure 2:
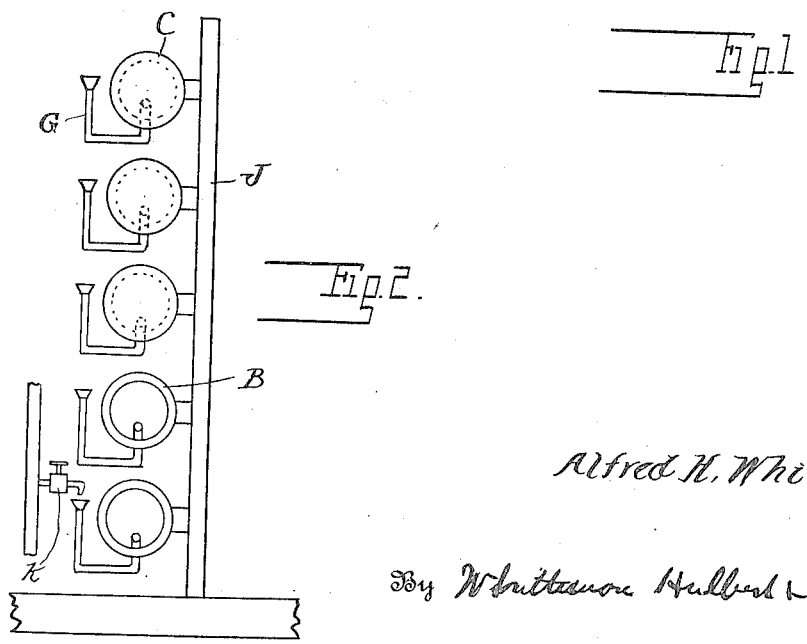

In the drawings I have illustrated one specific form of apparatus adapted for the carrying out of my process, Figure 1 illustrating a longitudinal section and Fig. 2 an end elevation.

A is the furnace chamber, which is heated by any suitable means, and B are retorts arranged within the chamber A and preferably arranged in an inclined position and extending through the opposite walls of the furnace. These retorts are also preferably provided with removable caps C to facilitate the cleaning of the same and removal of carbon deposits. As shown D is the grate arranged beneath one end of the retorts and E is a division wall for compelling the products of combustion ascending from the grates to descend adjacent the opposite ends of the retorts to the escape flue F. This specific arrangement is not, however, essential and any other suitable heating means may be employed as a substitute.

In carrying out the process the furnace is heated so as to maintain within the retorts a temperature within the limits above described, and preferably between 550 and 600 degrees F. The liquor is then introduced by suitable means, such as the trap feed conduit G which preferably extends into the retort a sufficient distance to introduce the liquor into the high-temperature zone. This will cause a foaming or frothing and charring which gradually fills the interior of the retort with a very porous black ash, offering a large amount of contact surface, as indicated at H Fig. 1. If desired, black ash may be placed in a portion of the retort, as indicated at I, before the introduction of the liquor, this being particularly advantageous where the diameter of the retort is relatively large; with higher temperatures, however, it is not so essential. The vapor product is drawn off through a conduit J connected with the several retorts. The black ash acts as a catalyzer, and in this capacity is of value to the processs.

The rate of flow of the liquid is regulated by suitable valves, as K so as to retain the vapor within the retort for the desired length of time. I have found that with a temperature of from 550 to 600 degrees F. the best results are obtained by holding the vapor within the retort 15 seconds, having obtained by such treatment a distillate containing as much as 4.9 per cent. by volume of methyl alcohol and acetone. The time during which the vapors are retained within the retort must depend upon the rate of admission of the liquid since the faster the liquid is admitted the faster it will vaporize and the greater the production of vapor the more rapidly it must be displaced. Under varied conditions of temperature and amount of contact surface the rate of flow must be correspondingly changed within the limits above described.

One of the advantageous features of my process is that the several factors of temperature, rate of flow and amount of contact may be separately controlled, and thus I am enabled to vary conditions so as to obtain the best results according to the material used and the products desired. This also enables me to control the exothermic reaction, so that instead of interfering it assists in the formation of the desired product. The temperature will be controlled by properly regulating the fire. The amount of contact surface will be controlled by the amount of ash that is placed in the retort or allowed to accumulate therein.

In the continuation of the process the retort is eventually filled or largely filled with the black ash and as frequently as necessary this may be removed by opening the heads C at the opposite ends of the retort and forcing the ash out with a suitable instrument.

I desire to also call attention to the fact that with my process the liquid is introduced directly into the heated zone where destructive distillation takes place, and that in this heated chamber it is spread out over an extended contact surface. This contact surface is first formed by the inner face of the retort, and when this becomes covered with a coating of black ash the latter acts as the heated contact surface. The destructive distillation takes place mainly at the surface of the black ash and by means of heat transmitted through it. The heated gases and vapors pass at once through a layer of undistilled liquor and are thereby cooled so that they cannot more than momentarily be overheated through an exothermal reaction or a local high temperature of the black ash. The liquid flowing over this contact surface is of a much lower temperature, which prevents carbonization within the body of the liquid and thus avoids the formation of a sticky mass difficult to manipulate. In other words, with my process I obtain without the use of mechanical agitators a constant feeding of the material into the retort and uniform treatment of the material thus fed in throughout the entire process. This together with the accurate control of temperatures, rate of flow and amount of contact surface enables me to obtain a higher yield of the desired product than has heretofore been possible.

As a result of the introduction of the liquor directly into the heated zone of the retort evaporation and destructive distillation are carried on simultaneously so that the gaseous products of the destructive distillation are commingled with the water vapor within the retort, which is a condition favorable to a high yield of the desired products.

In the building up of the black ash upon the inner surface of the retort it is evident that carbonization will take place more rapidly where the surface is hottest. This tends to equalize temperature conditions within the retort, for the porous coating acts as a heat insulator and therefore the increased deposit on the hot surface will diminish the rate of heat conduction.

What I claim as my invention is:—

1. The process of forming valuable products from waste liquors containing organic matter, comprising the gradual introduction of the liquor into a retort for destructive distillation, and maintaining the vapor within said retort at a temperature from 450 to 700 degrees F. and for a time from 5 to 150 seconds.

2. The process of manufacturing methyl alcohol, acetone and other valuable products from waste liquors of mills manufacturing wood pulp by the soda process, comprising feeding the concentrated liquor gradually into a retort where it spreads out in a thin layer and is rapidly subjected to destructive distillation, and maintaining the temperature within the vapor space from 550 to 600 degrees F.

3. The process of manufacturing methyl alcohol, acetone and other valuable products from waste liquors of mills manufacturing wood pulp by the soda process, comprising feeding the concentrated liquor gradually into a retort maintained at a temperature between 450 and 700 degrees F., in which retort the liquor is spread out in a thin layer and is rapidly subjected to destructive distillation, and regulating the rate of feed to maintain the gases within the retort from 5 to 150 seconds varying with the temperature and the amount of contact surface which acts as a catalyzer.

4. The process of manufacturing methyl alcohol, acetone and other valuable products from waste liquors of mills manufacturing wood pulp by the soda process, comprising feeding the concentrated liquor gradually into a retort heated from 450 to 700 degrees F., where it spreads out in a thin layer and is rapidly subjected to destructive distillation attended with foaming and charring which fills the space with a porous black ash, and regulating the rate of feed to maintain the vapor in the retort from 5 to 150 seconds varying according to the temperature and amount of contact substance acting as a catalyzer, the time being increased for low temperatures and decreased for higher temperatures.

5. The process of manufacturing methyl alcohol, acetone and other valuable products from the waste liquors of mills manufacturing wood pulp by the soda process, comprising feeding the concentrated liquor gradually into a heated retort, and regulating the rate of flow and the external heating of the retort to control the exothermic reaction and to maintain the vapors within the retort under a temperature from 450 to 700 degrees F. and for a time varying from 5 to 150 seconds.

6. The process of forming valuable products from waste liquors containing organic matter, comprising feeding the concentrated liquor gradually directly into a zone of a retort heated to above the point of destructive distillation, and spreading out the liquor over an extended contact surface to confine the carbonization to successively formed thin layers.

7. The process of forming valuable products from waste liquors containing organic matter, comprising feeding the concentrated liquor which is at a temperature below that of destructive distillation directly into a retort having a temperature above that of destructive distillation, and spreading the liquor into a comparatively thin layer before it attains the temperature of destructive distillation.

8. The process of manufacturing valuable products from waste liquors containing organic matter, comprising the feeding of concentrated liquor having a temperature less than that of destructive distillation directly into a retort heated to above the point of destructive distillation and in contact with porous charcoal acting as a catalyzer, whereby vaporization of the water is carried on simultaneously with destructive distillation and affects the reaction.

9. The process of securing destructive distillation of liquors containing organic matter at constant temperature, comprising the flowing of the liquid over a heated surface to form a carbonaceous deposit thereon, said deposit being of greater thickness where the surface is hottest, and thereby forming a heat insulator which equalizes the temperature of all portions of the contact surface where the destructive distillation continues.

10. In a process of securing destructive distillation of liquid containing organic matter, the step of flowing thin layers of the liquid into a retort over a freshly formed carbonaceous contact surface, through which the heat for destructive distillation is transmitted to the liquor.

11. The process of securing destructive distillation of thin layers of liquid containing organic matter, comprising the flowing of the liquor into a retort over a freshly formed carbonaceous contact surface through which the heat for destructive distillation is transmitted to the liquor, and protecting the liquid in contact with said surface from radiant heat by the superposed layer of undistilled liquid flowing thereover.

12. The process of securing destructive distillation of thin layers of liquid containing organic matter, comprising flowing the liquor into a retort over a heated surface to form a carbonaceous deposit thereon, automatically increasing in thickness at the points where the metal is hottest and thereby equalizing the temperature of the carbonaceous contact with the liquid and protecting the liquid in contact with said surface from radiant heat by the superposed layer of liquid flowing thereover.

In testimony whereof I affix my signature in presence of two witnesses.

ALFRED H. WHITE.

Witnesses:
  JAMES P. BARRY,
  PHYLLIS COBURN.